United States Patent Office 3,184,432
Patented May 18, 1965

3,184,432
PROCESS FOR THE PRODUCTION OF
CYCLODODECANE DERIVATIVES
Günther Wilke, Mulheim (Ruhr), and Werner Pfohl, Hamburg, Germany, assignors to Studiengesellschaft Kohle m.b.H., Mulheim (Ruhr), Germany, a body corporate of Germany
No Drawing. Filed Oct. 23, 1958, Ser. No. 769,086
Claims priority, application Germany, Oct. 24, 1957, St 13,079
3 Claims. (Cl. 260—617)

This invention relates to a process for the production of cyclododecane derivatives.

It is known that olefines can be reacted with carbon monoxide and hydrogen in the presence of cobalt salts to form aldehydes or their reduction products, the corresponding alcohols, which can be produced by direct hydrogenation. Cobalt hydrocarbonyl, $Co(CO)_4H$, which is a compound with very strong acid properties, and is the effective catalyst, is formed intermediately in this reaction.

Belgian patent specifications Nos. 555,180 and 564,175 are concerned with processes for the production of cyclic hydrocarbons with at least 8 carbon atoms, more especially cyclododecatri-1,5,9-enes with high yields.

Cyclododecatrienes, and more especially cyclododecatri-1,5,9-ene which is derived from butadiene, constitute reactive and consequently valuable compounds for further reactions, because of the three double bonds in the ring.

It is stated in Belgian patent specification No. 567,112 that cyclododecatri-1,5,9-ene undergoes more profound changes on being treated with strongly acid reagents, such as for example sulphuric acid, phosphoric acid, boron fluoride hydrates or alcoholates. A part of the triolefine is isomerised with the disappearance of the double bonds, while another part is polymerised in a completely undefined manner.

In the light of the foregoing knowledge, it was not to be expected that cyclododecatrienes could be reacted under the conditions of the oxo reaction with carbon monoxide and hydrogen in the presence of cobalt hydrocarbonyl to form defined aldehydes or alcohols.

However, it has now surprisingly been found that, contrary to all expectations, such a reaction actually is possible. According to the present invention cyclododecane derivatives are obtained in the form of well-defined compounds, by reacting cyclododecatrienes with carbon monoxide and hydrogen in the presence of catalysts usual for the oxo synthesis and especially in the presence of cobalt compounds. The aldehydes which are advantageously obtained may be hydrogenated, if necessary immediately, to form alcohols.

It is in general possible to obtain aldehydes of cyclododecane as the reaction products of this oxo synthesis, but it has proved in most cases to be desirable to isolate, not the aldehydes, but their reaction products, the alcohols, immediately. For example, by oxo synthesis and immediate hydrogenation, a monohydroxymethyl cyclododecane (B.P.$_{0.2\ mm.}$=91° C.) and a bis-(hydroxymethyl) cyclododecane (B.P. $_{0.2\ mm.}$=142–144° C.) are obtained in pure form. The alcohols conform to the general formula

or

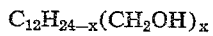

in which $x$ equals 1 to 3.

With the addition of carbon monoxide and hydrogen, 65–80% of the cyclododecatriene introduced or reacted is obtained as aldehydes or alcohols.

In accordance with the invention, the metal compounds generally suitable for oxo synthesis are employed as catalysts; advantageously the cobalt salts of higher fatty acids, or dicobalt octacarbonyl, are employed for this purpose.

The process will generally be carried out at pressures of carbon monoxide and hydrogen (1:1) of 50–400 atm. and preferably 150–300 atm., and more especially at temperatures between 100 and 200° C., and most advantageously between 135 and 145° C.

It is advisable to work in a solvent which is inert with respect to the reaction components, for example, hexane, but the reaction can also be effected without solvents.

The compounds which can be produced by the process of the invention serve as intermediate products for organic syntheses, and more especially for the production of plasticisers. Particular importance is attributed to the derivatives having several functional groups which are especially suitable as starting materials for obtaining plastics, for example polyesters.

The following examples further illustrate the invention:

Example 1

700 cc. of hexane, 7.5 g. of cobalt (fixed as a salt of an organic acid) and 2.5 g. of cobalt (reduced on kieselguhr at 430–470° C. with hydrogen) are placed in a 2-litre V2A autoclave having a magnetic stirrer mechanism and oil jacket heating. Carbon monoxide and hydrogen are then forced in to a pressure of 130 atm. and 110 atm. respectively and the autoclave heated to 130–150° C. 250 g. of cyclododecatriene are injected, in amounts of 25 cc. each, within 2 hours into the autoclave prepared in this way. On completion of the injection, the temperature is maintained for another 2½ hours and while stirring at 140–145° C. The excess gas is thereafter blown off at 40° C. Hydrogen is again introduced to a pressure of 150 atm. and the mixture is heated while stirring at 140–145° C. until it is no longer possible to observe any appreciable fall in pressure. The product is removed from the autoclave and the hexane is distilled off. If aldehyde groups can thereafter still be detected, the residue is taken up in methanol and again hydrogenated under pressure with the addition of Raney nickel. Thereafter, the catalyst is separated out, the methanol is removed and the colourless viscous residue is distilled in vacuo. After a small quantity of first runnings, 115 g. of a fraction with a B.P.$_{0.2\ mm.}$=90–91° C. and an M.P.=33° C. is obtained, this being monohydroxymethyl cyclododecane. Yield: 36% of the theoretical. Bis-(hydroxymethyl) cyclododecane distils over as a second fraction with a B.P.$_{0.2\ mm.}$=142–144° C. Yield: 145 g., 45% of the theoretical. 60 g. remain as a residue which probably contains tris-(hydroxymethyl) compounds.

Example 2

The procedure according to Example 1 is followed, but using perhydrocumene as solvent. The hydroxy methyl compounds of cyclododecane are obtained with corresponding yields on working up.

Example 3

The procedure according to Example 1 is followed, but the reaction temperature is raised to 180° C. On completion of the injection, the temperature is maintained for another hour at 160–180° C. and the product is then worked up. The hydroxy methyl cyclododecanes are obtined, again in comparable yields.

What we claim is:
1. Monocyclododecane derivatives having the formula $C_{12}H_{24-x}(CH_2OH)_x$, wherein $x$ is an integer from 1 to 2.
2. Monohydroxymethylmonocyclododecane having a boiling point B.P.$_{0.2 mm.}$ of between 90 and 91° C. and a melting point of 33° C.

3. Bis - hydroxymethylmonocyclododecane having a boiling point B.P.$_{0.2 mm.}$ of between 142 and 144° C.

References Cited by the Examiner

UNITED STATES PATENTS

| 2,037,876 | 4/36 | Bousquet | 260—617 |
| 2,212,151 | 8/40 | Coffman et al. | 260—617 XR |
| 2,738,370 | 3/56 | Staib et al. | 260—617 |
| 2,810,748 | 10/57 | Stewart et al. | 260—617 XR |
| 2,850,536 | 9/58 | Buchner et al. | 260—617 |

OTHER REFERENCES

"Higher Oxo Alcohols," page 13 (1 page), pub. by Enjay Laboratories, Enjay Company, Inc., New York (1957).

LEON ZITVER, *Primary Examiner.*

CHARLES E. PARKER, *Examiner.*